US 6,533,007 B1

(12) United States Patent
McMannis

(10) Patent No.: US 6,533,007 B1
(45) Date of Patent: Mar. 18, 2003

(54) TIRE HAVING SIDEWALL EXTENSIONS AT OPPOSITE ENDS OF EACH TREAD ELEMENT

(76) Inventor: Lee A. McMannis, 6223 Simon La., Hudson, OH (US) 44236

( * ) Notice: Subject to any disclaimer, the term of this patent is extended or adjusted under 35 U.S.C. 154(b) by 0 days.

(21) Appl. No.: 09/517,480

(22) Filed: Mar. 2, 2000

(51) Int. Cl.⁷ .................... B60C 11/113; B60C 121/00
(52) U.S. Cl. .................... 152/209.16; 152/209.22; 152/209.28; 152/523
(58) Field of Search .................... 152/209.16, 523, 152/209.28, 209.12, 209.18, 209.8, 209.9, 209.22; D12/605

(56) References Cited

U.S. PATENT DOCUMENTS

| | | | | |
|---|---|---|---|---|
| 1,608,077 A | * | 11/1926 | Wieser | 152/523 |
| D124,820 S | * | 1/1941 | Rideout | D12/152 |
| 2,642,914 A | * | 6/1953 | Palko et al. | 152/209.28 |
| 3,818,965 A | * | 6/1974 | Newman | 152/209.18 |
| 4,265,287 A | * | 5/1981 | Abe et al. | |
| 4,383,567 A | * | 5/1983 | Crum et al. | 152/209.12 |
| 4,606,389 A | * | 8/1986 | Haas | 152/209.28 |
| 4,905,747 A | * | 3/1990 | Ogawa | 152/209.16 |
| 4,915,150 A | * | 4/1990 | Takusagawa et al. | 152/209.16 |
| 5,058,643 A | * | 10/1991 | Nakasaki | |
| 5,188,683 A | * | 2/1993 | Bonko | 152/209.16 |
| 6,189,586 B1 | * | 2/2001 | Guidry | 152/209.16 |
| 6,250,353 B1 | * | 6/2001 | Maxwell | 152/209.16 |
| 6,263,933 B1 | * | 7/2001 | Baus | |
| 6,293,323 B1 | * | 9/2001 | Binsfeld | |
| 6,298,890 B1 | * | 10/2001 | Binsfeld | |

FOREIGN PATENT DOCUMENTS

| | | | | |
|---|---|---|---|---|
| AT | 167904 | * | 3/1951 | 152/209.16 |
| FR | 2411094 | * | 7/1979 | |
| GB | 1195942 | * | 6/1970 | |
| JP | 62-4611 | * | 1/1987 | 152/209.28 |
| JP | 1-95912 | * | 4/1989 | 152/209.28 |
| JP | 4-110209 | * | 4/1992 | 152/209.16 |
| JP | 5-294114 | * | 11/1993 | 152/209.16 |
| JP | 5-319022 | * | 12/1997 | 152/209.16 |

* cited by examiner

Primary Examiner—Steven D. Maki
(74) Attorney, Agent, or Firm—Killworth, Gottman, Hagan & Schaeff LLP

(57) ABSTRACT

An off-road tire has sidewall tread element extensions with steps that provide gripping action and support around the sidewall, and enable the tire to climb the sides of rocks and ruts. The steps are located at different distances from the tire rotational axis and from the tire tread centerline.

24 Claims, 7 Drawing Sheets

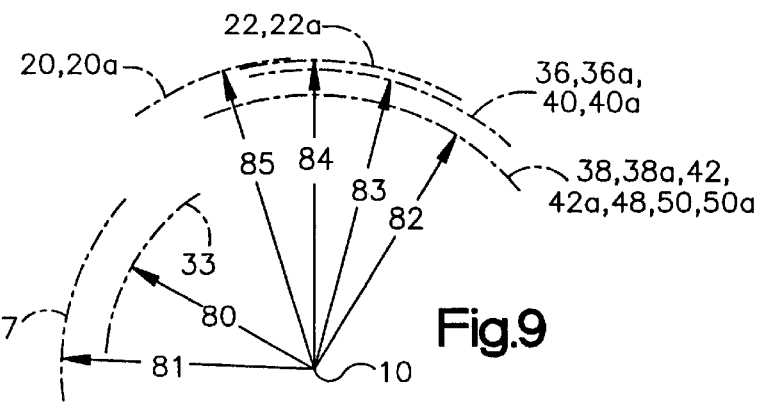
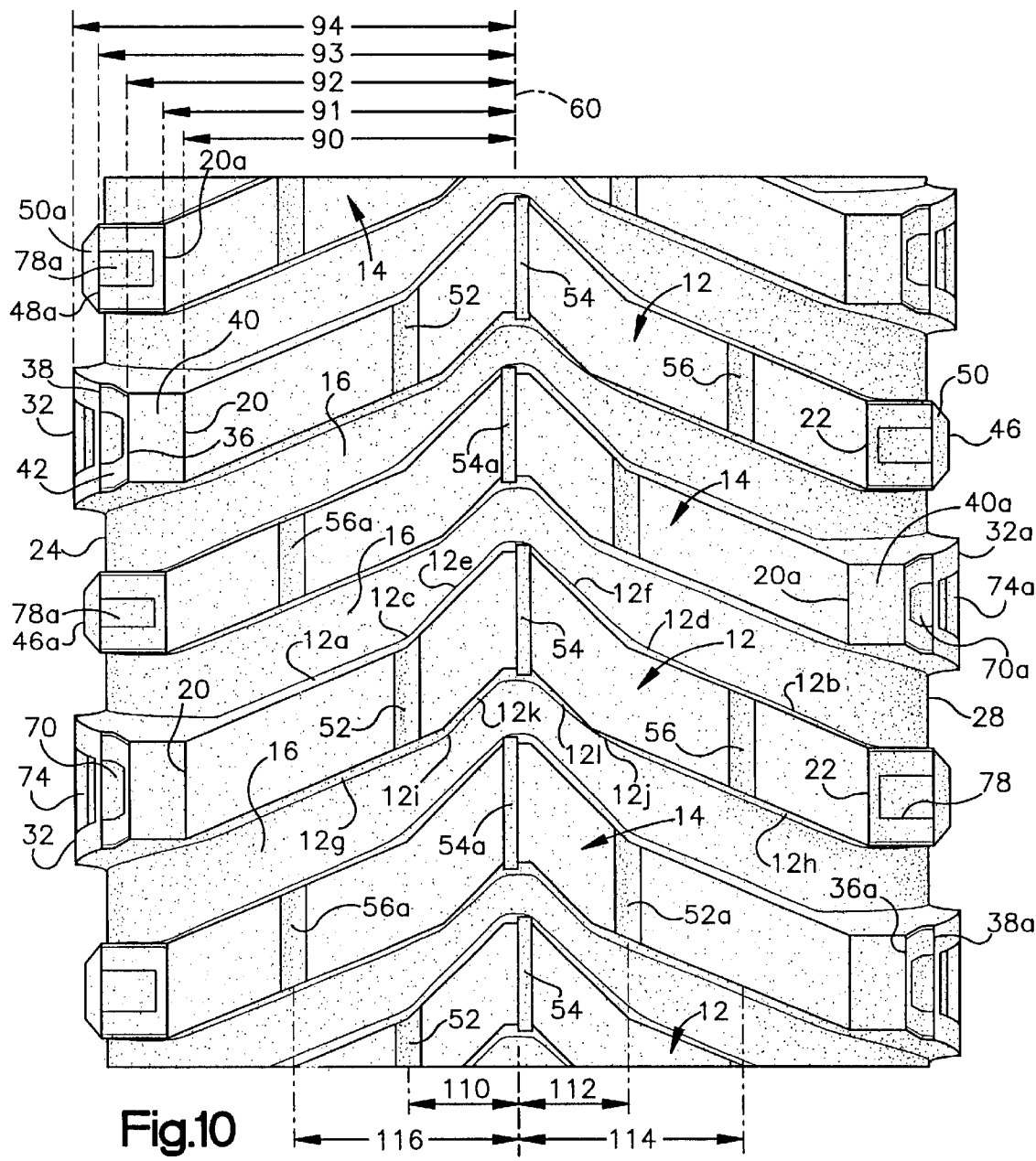

TIRE HAVING SIDEWALL EXTENSIONS AT OPPOSITE ENDS OF EACH TREAD ELEMENT

BACKGROUND OF THE INVENTION

This application relates to the art of tires and, more particularly, to tire treads. The invention is particularly applicable for use with tires that are designed for off-road use and will be described with specific reference thereto. However, it will be appreciated that the invention has broader aspects and that features of the invention may be used on tires that are designed for other purposes.

Vehicles being driven in off-road terrain often become stuck in ruts or among large rocks because the tires loose traction and/or support. Tire sidewalls usually have inadequate traction and/or support surfaces that would allow the tire to gain traction against and/or climb the side of a rut or rock. It would be desirable to have a tire with performance characteristics providing sidewall traction and sidewall support surfaces that enable the tire sidewall to gain traction on and/or climb the sides of rocks and ruts.

SUMMARY OF THE INVENTION

In accordance with the present application, a tire tread has tread elements with sidewall extensions that extend along the tire sidewalls toward the tire rotational axis and that project outwardly from the tire sidewalls away from the tire tread centerline. A plurality of the sidewall extensions are sidewall primary extensions that have at least two steps therein radially of the tire rotational axis to provide at least two sidewall primary extension support surfaces that face away from the tire rotational axis and are spaced different distances from the tire rotational axis and from the tire tread centerline. The tread elements themselves have outer tread support surfaces that are spaced farther from the tire rotational axis than either of the primary extension support surfaces.

In one arrangement, the sidewall extensions include sidewall secondary extensions that are located intermediate the sidewall primary extensions circumferentially of each tire sidewall. The sidewall secondary extensions are smaller than the sidewall primary extensions both radially and circumferentially of the tire, and have at least one step therein to provide at least one secondary extension support surface that faces away from the tire rotational axis.

In accordance with another aspect of the application, the sidewall primary extensions have outer surfaces that intersect the tread support surfaces at primary intersections, and the sidewall secondary extensions have outer surfaces that intersect the tread support surfaces at secondary intersections. The secondary intersections are spaced outwardly from the tread centerline a greater distance than the spacing of the primary intersections from the tread centerline.

The sidewall extensions preferably have outer surfaces that extend along the tire sidewalls and have depressions therein that open outwardly in a direction away from the tread centerline.

The sidewall primary extensions preferably have opposite sides that diverge in a direction toward the tire rotational axis. This provides the primary extensions with a progressively increasing circumferential width proceeding in a direction from the tire tread surface and along the tire sidewall toward the tire rotational axis.

The sidewall secondary extensions have a constant width along the tire sidewalls in a direction circumferentially of the tire sidewalls, and the width of the sidewall secondary extensions is less than the width of the sidewall primary extensions.

In accordance with another aspect of the application, the outer surface of each tread element has an inner circumferential groove spaced a first distance outwardly from the tread centerline on one side thereof, and an outer circumferential groove therein on the opposite side of the tread centerline from the first circumferential groove and spaced outwardly from the tread centerline a second distance greater than the first distance. Alternate ones of the tread elements have the inner circumferential grooves therein located on one side of the tread centerline and the remainder of the tread elements have the inner circumferential grooves therein located on the opposite side of the tread centerline.

The tread elements have circumferential central grooves therein, and alternate ones of the tread elements have the central grooves therein located on one side of tread centerline while the remainder of the tread elements have the central grooves therein located on the opposite side of the tread centerline. One sidewall of each central groove is coincidental with the tread centerline.

A tire tread in accordance with the present application has two different tread elements that alternate around the circumference of the tire. One tread element has a sidewall primary extension at one end thereof along one sidewall and a sidewall secondary extension at the opposite end thereof along the other tire sidewall. The next adjacent tread element is reversed so that its sidewall primary extension extends along the other sidewall while its sidewall secondary extension extends along the one sidewall.

It a principal object of the present invention to provide a tire having excellent off-road traction. It is another object of the invention to provide an off-road tire with sidewalls having traction elements that enable the tire to gain traction on and/or climb the sides of rocks and ruts.

It is an additional object of the invention to provide such a tire that has self-cleaning action in mud and snow.

It is a further object of the invention to provide a tire with tread elements that extend along the tire sidewalls and have steps therein to provide sidewall support surfaces at a plurality of different distances from the tire rotational axis and from the tread centerline.

BRIEF DESCRIPTION OF THE DRAWING

FIG. 9 is a diagrammatic illustration showing the location of support surfaces at different distances from the tire rotational axis; and FIG. 10 is a plan view of a portion of the tire tread showing distances of support surface intersections from the tire tread centerline, along with distances of inner and outer circumferential grooves from the tire tread centerline.

DESCRIPTION OF A PREFERRED EMBODIMENT

Figure 1:
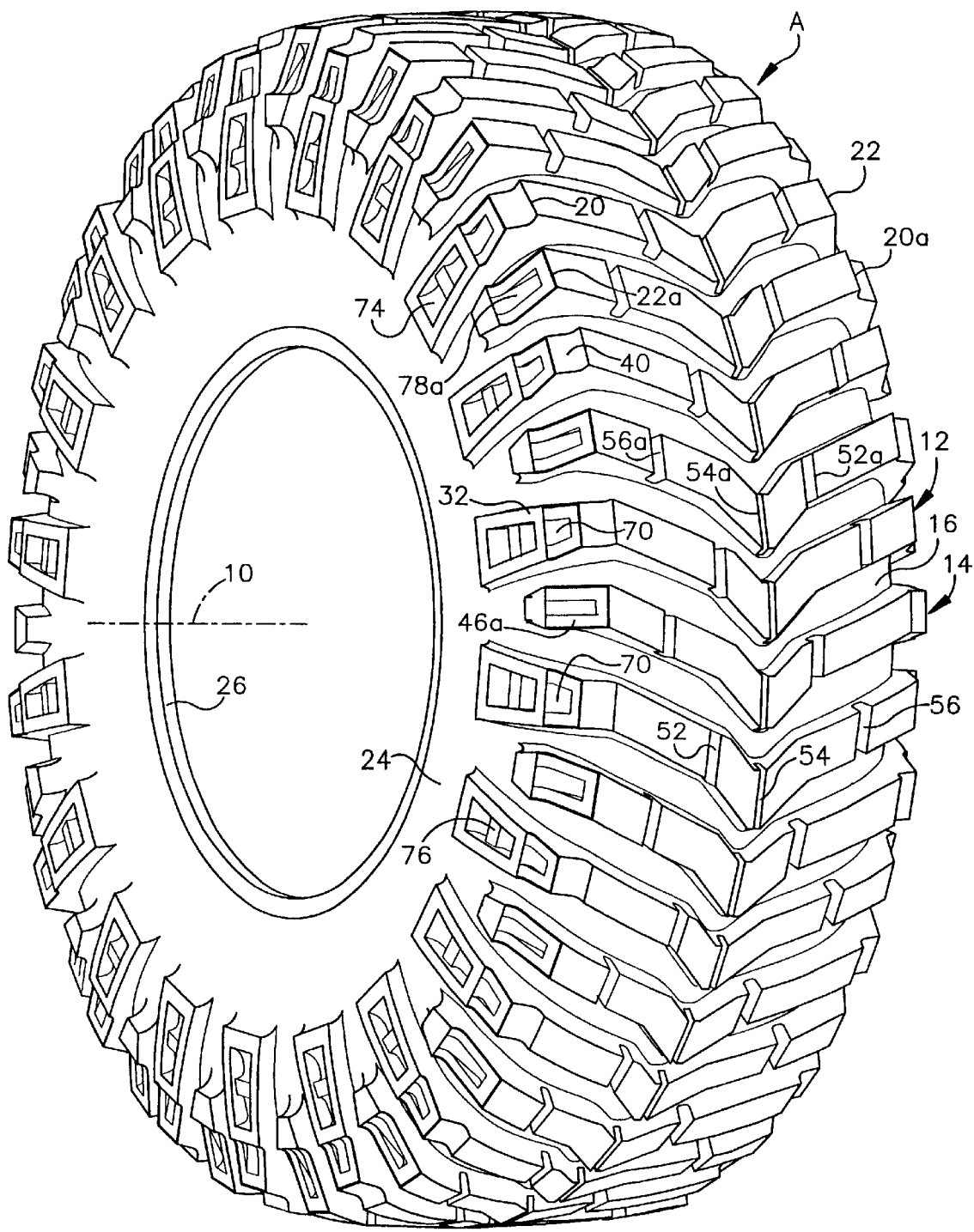
FIG. 1 is a perspective illustration of a tire constructed in accordance with the present application.
Figure 2:
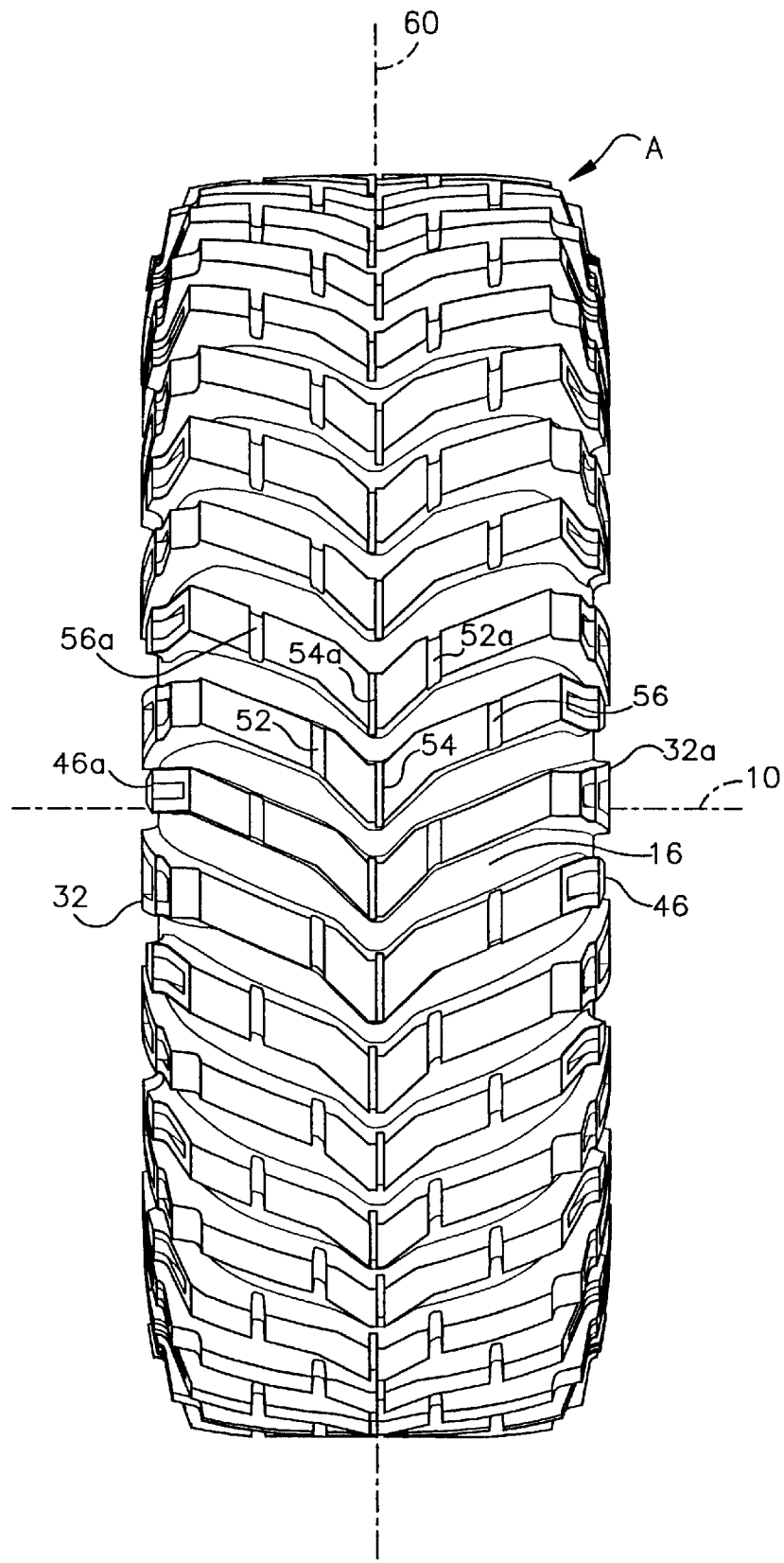
FIG. 2 is a front elevational view of the tire.

Referring now to the drawing, wherein the showings are for purposes of illustrating a preferred embodiment of the invention only and not for purposes of limiting same, FIG. 1 shows a tire A having a tire rotational axis 10. Tire A includes a circumferential tread having a plurality of tread elements, only two of which are identified by numerals 12 and 14 in FIG. 1. The transverse tread elements are separated from one another by transverse slots as indicated in FIG. 1 by numeral 16. Tread elements 12 and 14 alternate with another around the circumference of the tire and have a generally chevron or herringbone pattern.

Figure 5:
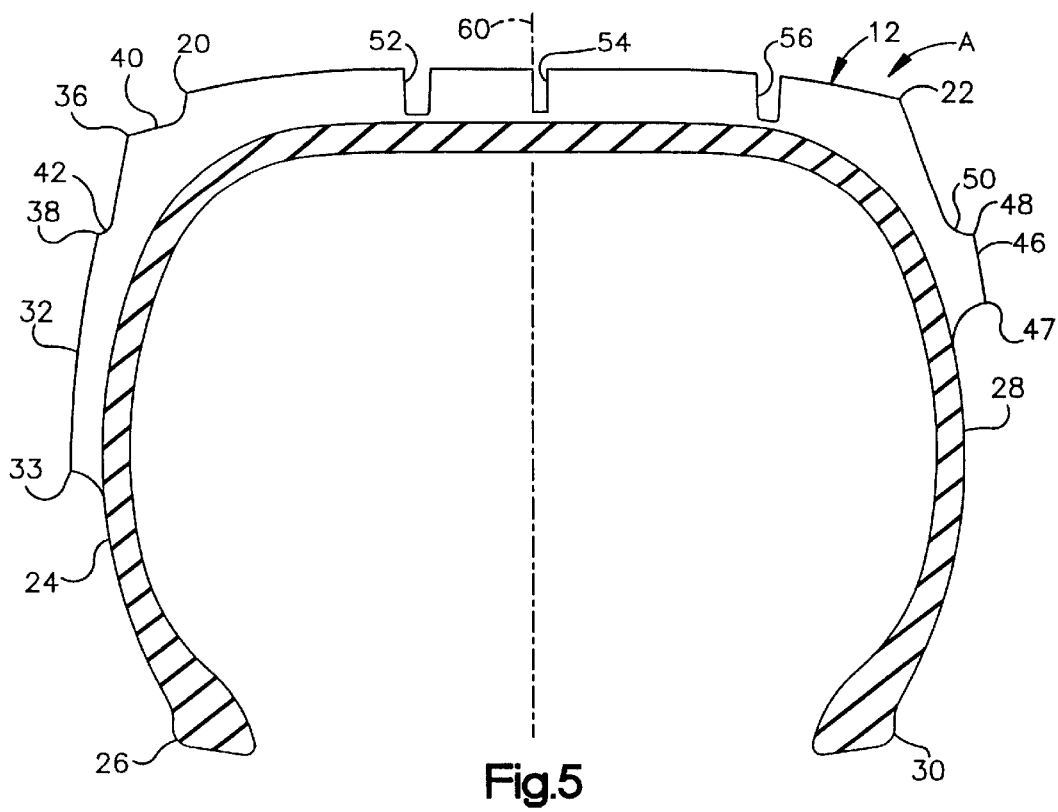
FIG. 5 is a cross-sectional elevational view taken generally on line 5—5 of FIG. 4.

With reference to FIG. 5, the outer pavement engaging surface of tread element 12 extends across the outer periphery of the tire between tread elements ends 20 and 22. Tire sidewall 24 may be considered to extend from tread element end 20 to circular bead 26 that surrounds the circular tire opening that receives a wheel. Tire sidewall 28 may be considered to extend from tread element end 22 to the other circular bead 30.

Tread element 12 has a sidewall primary extension 32 that extends along sidewall 24 to a primary extension end 33 from which the extension curves toward and merges into the tire sidewall. A pair of first and second steps having first and second step outer edges 36 and 38 are formed in sidewall primary extension 32 to provide outwardly facing first and second support surfaces 40 and 42.

The opposite end of tread element 12 has a sidewall secondary extension 46 extending along sidewall 28 a shorter distance than sidewall primary extension 32 to a secondary extension end 47 from which the extension curves toward and merges into the tire sidewall. Sidewall secondary extension 46 has a step therein with a step outer edge 48 to provide an outwardly facing support surface 50.

In the arrangement shown and described, tread element end 20 also defines a primary intersection between sidewall primary extension 32 and tread element 12. Likewise, tread element end 22 defines a secondary intersection between sidewall secondary extension 46 and tread element 12. Both the primary and secondary intersections 20 and 22 are lines that extend circumferentially of the tire parallel to the tread centerline circumference.

Tread element 12 has three circumferential grooves formed therein as indicated by an inner groove 52, a central groove 54 and an outer groove 56. These grooves are located in different positions relative to circumferential centerline 60 of tire A as described hereafter.

Figure 6:
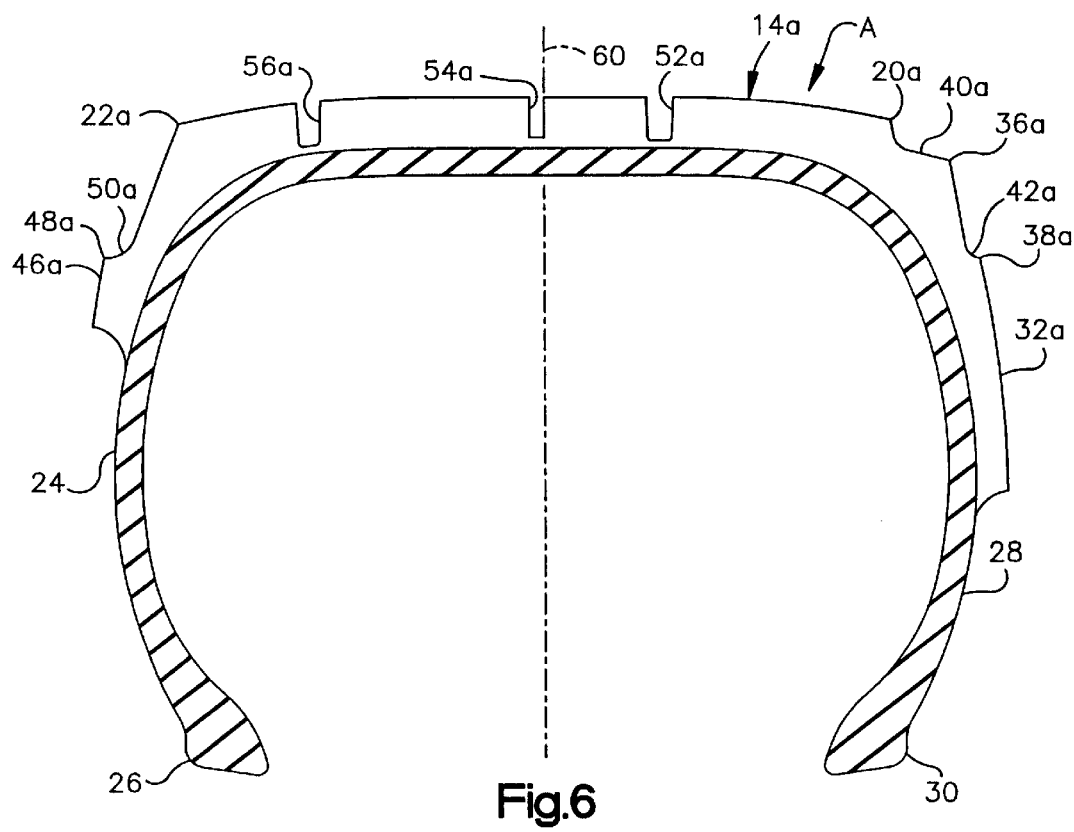
FIG. 6 is a cross-sectional elevational view taken generally on line 6—6 of FIG. 4.

With reference to FIG. 6, tread element 14 essentially is the reverse or a mirror image of tread element 12. Thus, tread element 14 has a sidewall primary extension 32a extending along sidewall 28 that is the same as sidewall primary extension 32 that extends along sidewall 24 in FIG. 5.

Likewise, tread element 14 has a sidewall secondary extension 46a extending along sidewall 24 that corresponds to sidewall secondary extension 46 extending along sidewall 28 in FIG. 5. The individual features of tread element 14 and its sidewall extensions are identified by the same reference numerals as the corresponding features of tread element 12 with the addition of the letter "a."

Figure 3:
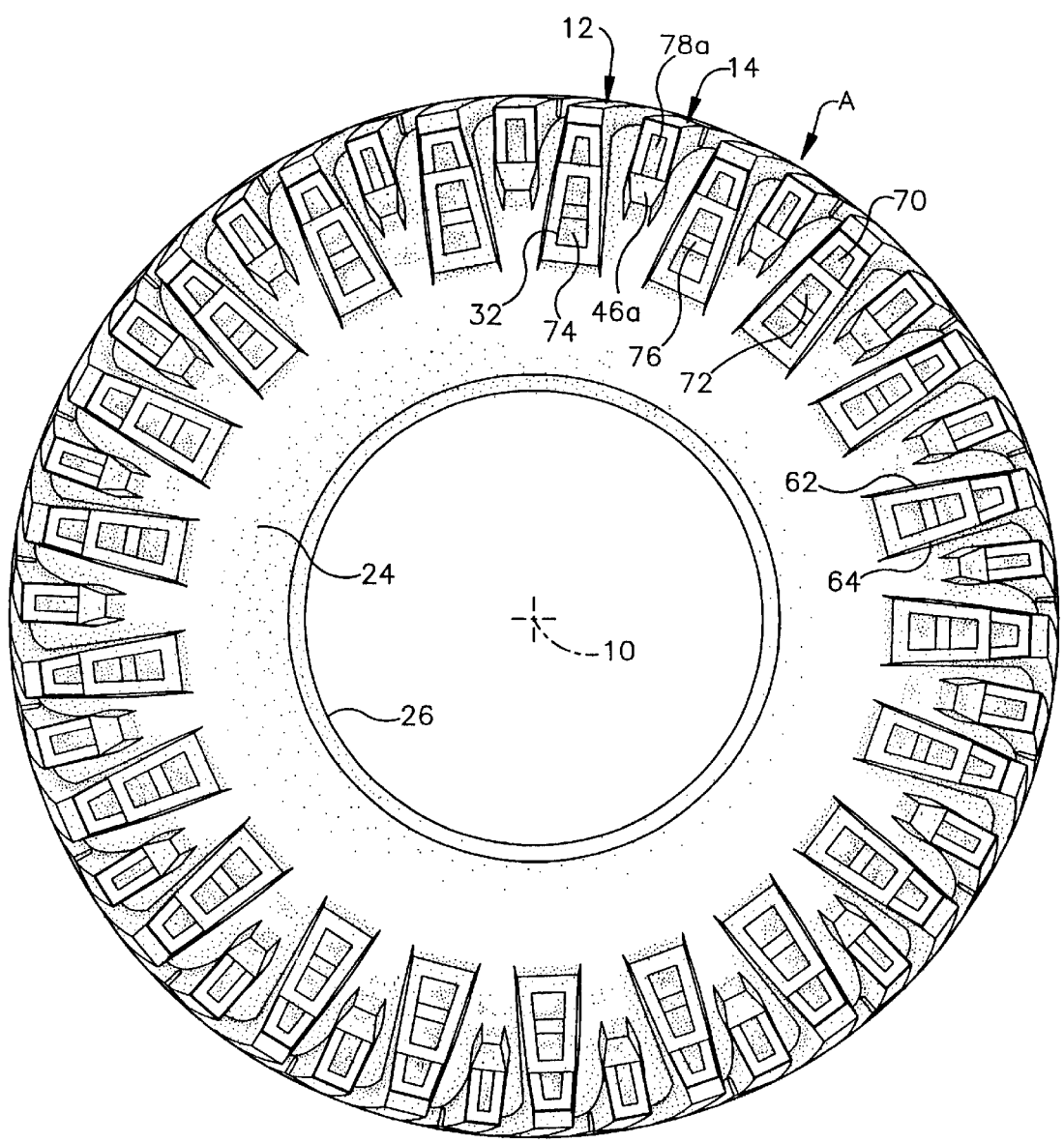
FIG. 3 is a side elevational view of the tire.
Figure 4:
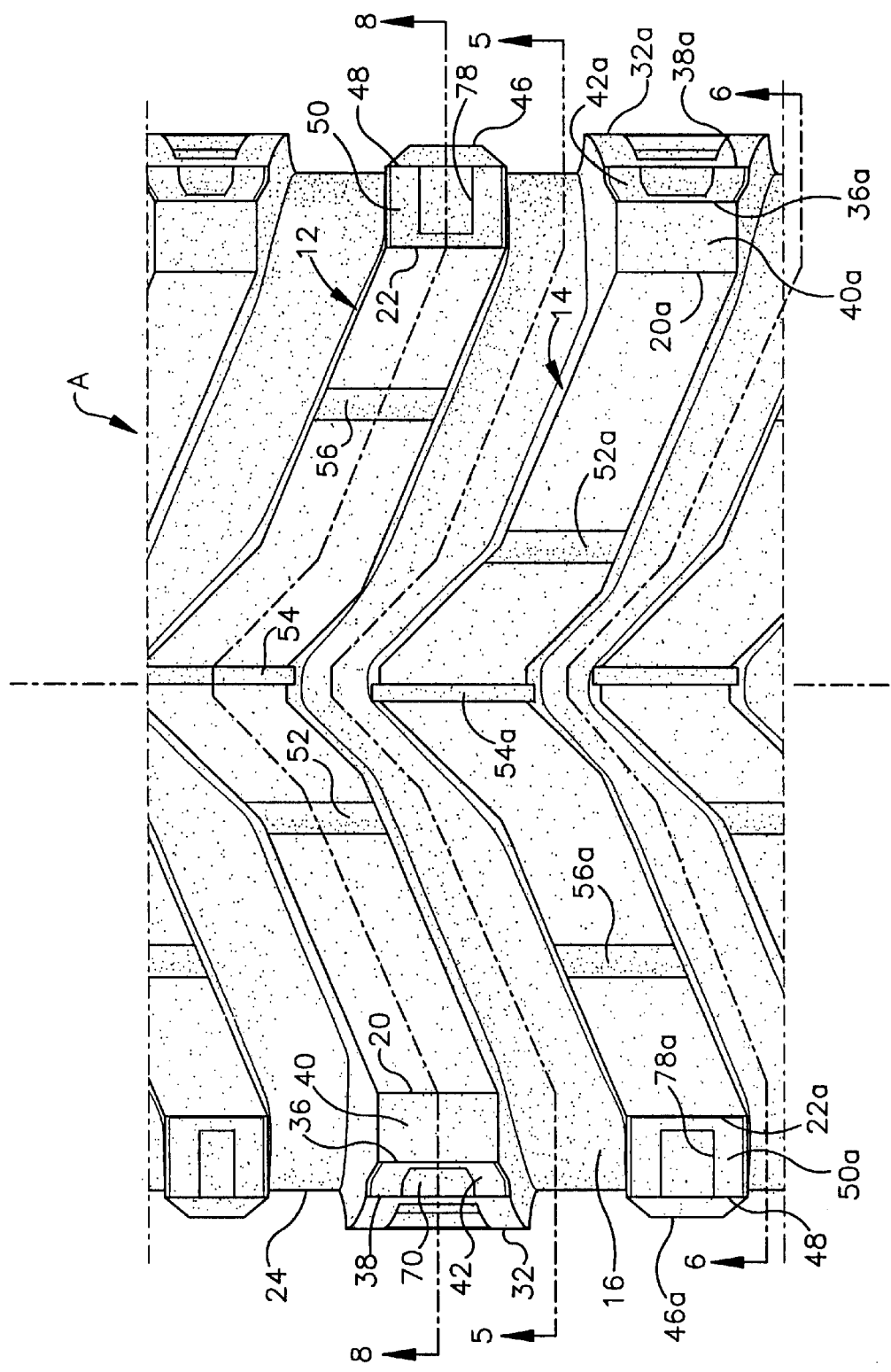
FIG. 4 is a partial plan view of a portion of the tire tread.

As best shown in FIG. 3, sidewall primary extensions 32 on tread elements 12 have opposite sidewalls 62, 64 that diverge in a direction toward tire rotational axis 10. In other words, the width of the primary sidewall extensions gradually increases from the outer surface of the tread elements toward the tire rotational axis. Sidewall primary extensions 32a on tread elements 14 are similarly shaped. Sidewall secondary extensions 46, 46a have a constant circumferential width radially of the tire sidewalls which is less than the circumferential width of the sidewall primary extensions.

Figure 7:
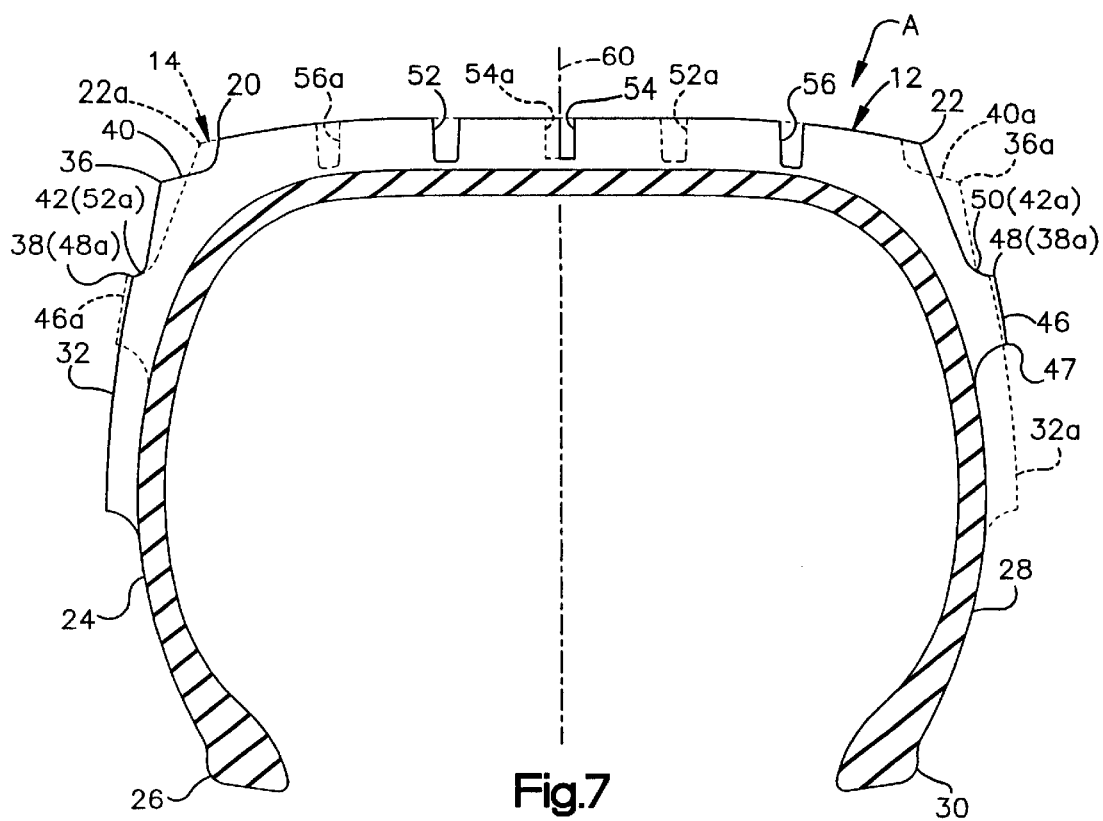
FIG. 7 is a combination of FIGS. 5 and 6 superimposed on one another to illustrate the difference between adjacent tread elements.

FIGS. 5 and 6 are superimposed on one another in FIG. 7 with the features of tread element 14 shown in dotted lines with respect to the solid line showing of tread element 12.

Figure 8:
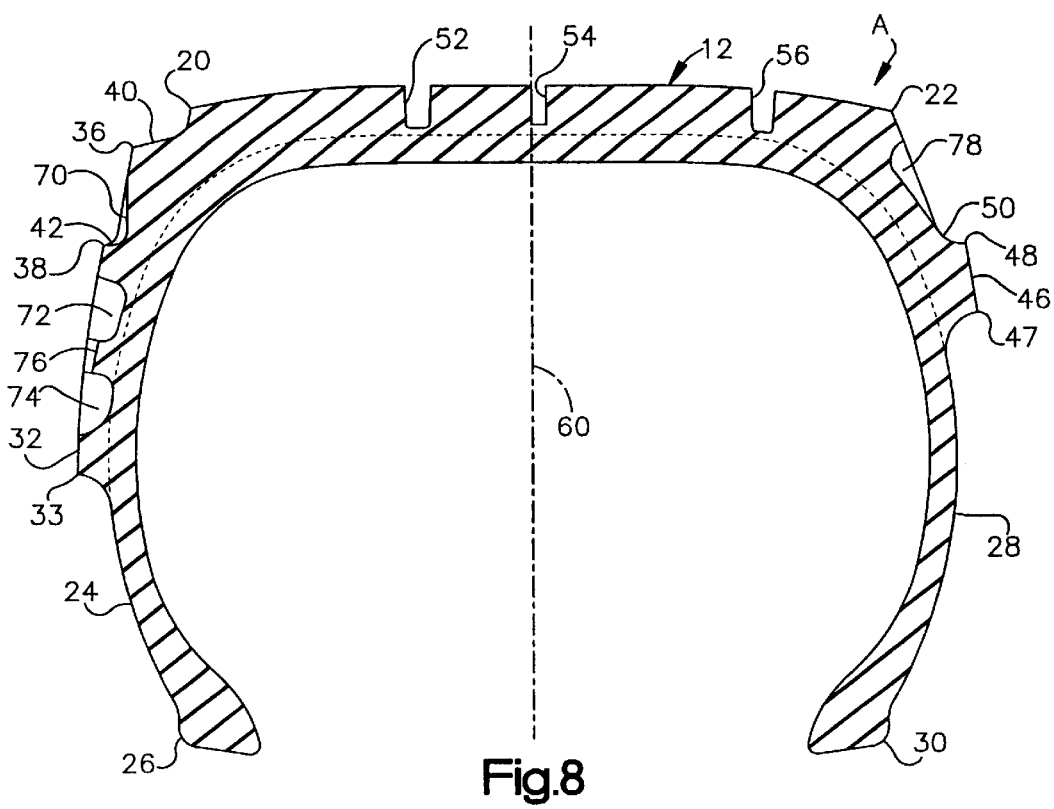
FIG. 8 is a cross-sectional elevational view taken generally on line 8—8 of FIG. 4.

With reference to FIG. 8, sidewall primary extension 32 has a recess 70 therein between first and second step edges 36 and 38. Sidewall primary extension 32 has a pair of recesses 72 and 74 below second step outer edge 38 that are separated by a horizontal web 76. Sidewall secondary extension 46 also has a recess 78 therein between intersection 22 and step outer edge 48.

As shown on FIG. 9, the end 33 of sidewall primary extension 32, 32a is located a distance 80 outwardly from tire rotational axis 10. The end 47 of sidewall secondary extension 46, 46a is located a greater distance 81 outwardly from tire rotational axis 10. Edge 38, 38a of second support surface 42, 42a on the sidewall primary and secondary extensions are located a still greater distance 82 outwardly from tire rotational axis 10. Distance 82 also defines the radial spacing for step edges 48, 48a on the sidewall secondary extensions, as well as the start of outwardly facing support surfaces 50, 50a on the sidewall secondary extension. First step edge 36, 36a is located a farther distance 83 outwardly from tire rotational axis 10. Distance 83 also corresponds to the spacing from tire rotational axis 10 of first support surfaces 40, 40a on sidewall primary extensions 32, 32a.

Distance 84 indicates the spacing outwardly from tire rotational axis 10 of tread element end 22, 22a. Spacing 85 indicates the spacing outwardly from tire rotational axis 10 of tread element end 20, 20a. Distances 84, 85 are slightly different because the outer surface of the tire tread has a slight crown in the as-molded condition. However, distances 84, 85 are the same in the pavement engaging condition of the tire tread and also represent the distance of the tread outer surface from tire rotational axis 10.

Although each tread element has a width that extends between ends 20, 22 and 20a, 22a, the total width of the tread is larger because it extends from one end 22 of one tread element 12 adjacent one tire sidewall to an opposite end 22a of an adjacent tread element 14 adjacent the opposite tire sidewall.

With reference to FIG. 10, end 20 of tread element 12 is located a first distance 90 outwardly from tire tread centerline 60. End 20a of tread element 14 is located a second distance 91 that is greater than first distance 90 outwardly from tire tread centerline 60. First step outer edge 36 is located a distance 92 outwardly from tread centerline 60. Second step outer edge 38 on a sidewall primary extension, and step edge 48a on a sidewall secondary extension, are located a distance 93 outwardly from tire tread centerline 60. The outer surface of sidewall primary extension 32 is located a distance 94 outwardly from tire tread centerline 60 which is greater than the outward spacing of the outer surface of the sidewall secondary extensions from the tire tread centerline. Thus, the sidewall primary extensions project outwardly from the tire sidewalls a greater distance than the sidewall secondary extensions.

FIG. 10 also shows spacing 110 from tread centerline 60 to the center of circumferential inner grooves 52 in tread elements 12. Spacing 112 from tread centerline 60 to the center of circumferential inner grooves 52a in tread elements 14 is the same as spacing 110. Distance 114 from tread centerline 60 to the center of circumferential outer grooves 56 in tread elements 12 indicates the spacing of those grooves from the tread centerline. Circumferential outer grooves 56a are spaced outwardly on the opposite side of tread centerline 60 a distance 116 that is the same as distance 114.

As shown in FIG. 10, central grooves 54, 54a are narrower than grooves 52, 52a, 56, 56a and are staggered on opposite sides of tread centerline 60. Thus, central grooves 56 in tread elements 12 are on the right side of tread centerline 60 while central grooves 54a in tread elements 14 are on the left side of tread centerline 60. Each central groove is located on the same side of tread centerline 60 as the secondary extension of the tread element in which the central groove is formed. One groove sidewall of each central groove 54, 54a coincides with tread centerline 60, and the inner sidewalls of the central grooves also coincide with one another.

It will be recognized that not all of tread elements 12 and 14, along with their sidewall extensions, have the same size circumferentially of the tire. A plurality of different circumferential sizes normally are provided for noise treatment purposes in what is known in the art as pitches.

As shown in FIG. 10, each tread element 12 has long leading faces 12a and 12b, with leading face 12a extending from end 22 to transition point 12c, and long leading face 12b extending from end 22 to transition point 12d. Leading faces 12a and 12b extend at angles of approximately 68° to tread centerline 60. From transition points 12c and 12d, tread element 12 has short leading faces 12e and 12f that extend at angles of 45° to tread centerline 60.

Tread element 12 has trailing faces 12g and 12h extending parallel to leading faces 12a and 12b. Trailing face 12g extends between tread element end 20 and transition point 12i, while trailing face 12h extends from tread element end 22 to transition point 12j. From transition points 12i and 12j, short trailing faces 12k and 12l converge toward tread centerline 60 and extend parallel to short leading faces 12e and 12f.

Transition points 12i and 12j are located closer to tread centerline 60 than are transition points 12c and 12d. Therefore, short leading faces 12e and 12f are longer than short trailing faces 12k and 12l. From ends 20 and 22 outward, the leading and trailing faces of sidewall primary and secondary extensions 32, 46 extend approximately perpendicular to tread centerline 60.

Tread elements 14 have the same arrangement of long and short leading and trailing faces as described with reference to tread element 12.

As shown in FIG. 10, each inner circumferential groove 52, 52a is located on the same side of tread centerline 60 as sidewall primary extensions 32, 32a. Likewise, outer circumferential grooves 56, 56a are located on the same side of tread centerline 60 as sidewall secondary extensions 46, 46a. Each central groove 54, 54a is located on the same side of tread centerline 60 as sidewall secondary extensions 46, 46a. This is the arrangement for both tread elements 12 and 14 around the entire circumference of the tire.

In the arrangement shown and described, tire A has a rotational axis 10, a circumferential tread and opposite sidewalls 24, 28. The circumferential tread has a circumferential tread centerline 60 and a plurality of circumferentially-spaced tread elements 12, 14 separated from one another by transverse slots 16. The tread elements have sidewall extensions 32, 32a, 46 and 46a that extend along the sidewalls toward the rotational axis and that project outwardly from the sidewalls away from tread centerline 60. A plurality of the sidewall extensions are sidewall primary extensions 32, 32a having at least two steps therein to provide at least two primary extension support surfaces 40, 42 that face away from rotational axis 10 and are spaced different distances 83, 82 from rotational axis 10. Primary extension support surfaces 40, 42 also are spaced different distances outwardly from tread centerline 60 with first primary extension support surface being spaced between distances 90 and 91 in FIG. 10, while primary extension support surfaces 42 are spaced outwardly from tread centerline 60 between distances 91 and 92 in FIG. 10. The tread elements 12, 14 have outer tread support surfaces spaced farther outwardly from tire rotational axis 10 than primary extension support surfaces 40, 42 as indicated by distance 84–85 in FIG. 9.

The tire sidewall extensions also include sidewall secondary extensions 46, 46a located intermediate sidewall primary extensions 32, 32a. The sidewall secondary extensions are smaller than the sidewall primary extensions and have at least one step therein to provide at least one secondary extension support surface 50 that faces away from tire rotational axis 10.

The sidewall primary extensions 32, 32a have outer surfaces that intersect the tread support surfaces at primary intersections 20, 20a, and the sidewall secondary extensions 46, 46a have outer surfaces that intersect the tread support surfaces at secondary intersections 22, 22a. Secondary intersections 22, 22a are spaced outwardly from tread centerline 60 a greater distance 91 in FIG. 10 than the spacing 90 of primary intersections 20, 20a from tread centerline 60.

Referring to FIG. 10, each tread element 12, 14 has an inner circumferential groove 52 or 52a therein spaced a first distance 110 or 112 from tread centerline 60 on one side thereof, and an outer circumferential groove 56 or 56a spaced a second distance 116 or 114 from the tread centerline that is greater than first distance 110 or 112. Alternate ones of the tread elements, such as tread elements 12, have inner circumferential grooves 52 therein located on one side of tread centerline 60, while the remainder of the tread elements, such as tread elements 14, have the inner circumferential grooves 52a therein located on the opposite side of tread centerline 60. The same relationship applies for outer circumferential grooves 56 and 56a for the alternate tread elements 12 and the remainder tread elements 14.

Alternate ones of the tread elements have central groove 54 located on one side of tread centerline 60, while the remainder of the tread elements have the central grooves 54a therein located on the opposite side of tread centerline 60. For all of the tread elements, the central groove is located on the same side of the tread centerline as the tread element secondary extension.

In the arrangement shown and described, alternate ones of the tread elements have sidewall primary extensions on one of the tire sidewalls and sidewall secondary extensions on the other of the tire sidewalls. The remainder of the tread elements have the secondary extensions on the one sidewall, while the primary extensions are on the other of the sidewalls. Thus, the primary and secondary extensions alternate with one another circumferentially of each tire sidewall, with a primary extension on one sidewall being generally aligned with a secondary extension on the opposite sidewall.

As shown in FIG. 10, alternate tread elements 12 have alternate tread element outer edges 20 that are spaced a first distance 90 outwardly from tread centerline 60. The remainder of the tread elements 14 have remainder tread element outer edges 20a spaced a second distance 91 outwardly from tread centerline 60 that is greater than first distance 90. Sidewall extensions 32 that extend along a tire sidewall from the alternate tread elements 12 have a pair of first and second steps therein to define first and second step outer edges 36, 38. The first step outer edge 36 is spaced a third distance 92 outwardly from tread centerline 60 that is greater than second distance 91, and second step outer edge 38 is spaced a fourth distance 93 outwardly from tread centerline 60 that is greater than third distance 92. In addition, first and second step edges 36, 38 and alternate tread element outer edges 22 are spaced different distances 83, 82 and 84 from rotational axis 10 as shown in FIG. 9.

Tire A has tread element sidewall extensions 32 that have first steps therein to provide first support surfaces 40 that face away from tire rotational axis 10 and are spaced a first radial distance 83 of FIG. 9 from the tire rotational axis. Sidewall extensions 32 have second steps therein to provide second support surfaces 42 that face away from tire rotational axis 10 and are spaced a second radial distance 82 from tire rotational axis 10 that is less than first radial distance 83. The sidewall extensions are extensions of tread elements 12 that have tread support surfaces facing away from rotational axis 10 and spaced a third radial distance 84–85 from tire rotational axis 10 that is greater than either of the first and second radial distances 83, 82. In a preferred arrangement, the difference between first and second radial distances 83, 82 is greater than the difference between the first and third radial distances 83, 84–85.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A tire having tread elements that continuously extend from one sidewall to the other and sidewall extensions being disposed at opposite ends of each of said tread elements, said tread elements including a primary sidewall extension at one end and a secondary sidewall extension at the other end such that the primary sidewall extension has first steps therein to provide first support surfaces that face away from the tire rotational axis and are spaced a first radial distance from the tire rotational axis, and second steps therein to provide second support surfaces that face away from the tire rotational axis and are spaced a second radial distance from the tire rotational axis that is less than said first radial distance, said sidewall secondary extensions being smaller than said sidewall primary extensions and having at least one step therein to provide at least one secondary extension support surface that faces away from said rotational axis, said tread elements having tread support surfaces facing away from said rotational axis and spaced a third radial distance from the tire rotational axis that is greater than either of said first and second radial distances.

2. The tire of claim 1 wherein the difference between said first and second radial distances is greater than the difference between said first and third radial distances.

3. A tire having a rotational axis, a circumferential tread and opposite sidewalls, said tread having a circumferential tread centerline and a plurality of circumferentially-spaced tread elements that continuously extend from one sidewall to the other and are separated from one another by transverse slots, each of said tread elements having sidewall extensions at opposite ends thereof that extend along said sidewalls toward said rotational axis and that project outwardly from said sidewalls away from said tread centerline, a plurality of said sidewall extensions being sidewall primary extensions having at least two steps therein to provide at least two primary extension support surfaces that face away from said rotational axis and are spaced different distances from said rotational axis and from said tread centerline, and said tread elements having outer tread support surfaces spaced farther from said rotational axis than said primary extension support surfaces, and a plurality of said sidewall extensions being sidewall secondary extensions located intermediate said sidewall primary extensions, said sidewall secondary extensions being smaller than said sidewall primary extensions and having at least one step therein to provide at least one secondary extension support surface that faces away from said rotational axis.

4. The tire of claim 3 wherein said sidewall primary extensions have outer surfaces that intersect said tread support surfaces at primary intersections and said sidewall secondary extensions have outer surfaces that intersect said tread support surfaces at secondary intersections, and said secondary intersections being spaced outwardly from said tread centerline a greater distance than the spacing of said primary intersections from said tread centerline.

5. The tire of claim 3 wherein said sidewall extensions have outer surfaces with depressions therein that open outwardly in a direction away from said tread centerline.

6. The tire of claim 5 wherein said depressions in said primary sidewall extension are separated by a substantially horizontal web.

7. The tire of claim 3 wherein said sidewall primary extensions have opposite sides that diverge in a direction toward said rotational axis.

8. The tire of claim 7 wherein said sidewall primary extensions that have opposite sides that diverge in a direction toward said rotational axis are substantially trapezoidal-shaped.

9. The tire of claim 3 wherein each of said tread elements has an inner circumferential groove therein spaced a first distance from said tread centerline on one side thereof and an outer circumferential groove therein spaced a second distance that is greater than said first distance from said tread centerline on the other side thereof, and alternate ones of said tread elements having said inner circumferential grooves therein located on one side of said tread centerline and the remainder of said tread elements having said inner circumferential grooves therein located on the opposite side of said tread centerline.

10. The tire of claim 9 wherein said tread elements have circumferential central grooves therein, alternate ones of said tread elements having said central grooves therein located on one side of said tread centerline and the remainder of said tread elements having said central grooves therein located on the opposite side of said tread centerline.

11. A tire having a rotational axis, a circumferential tread and opposite sidewalls, said tread having a circumferential tread centerline and a plurality of circumferentially-spaced tread elements separated from one another by transverse slots, each of said tread elements having sidewall extensions at opposite ends thereof that extend along said sidewalls toward said rotational axis and that project outwardly from said sidewalls away from said tread centerline, said sidewall extension at one end of each said tread element being a sidewall primary extension and said sidewall extension at the opposite end of each said tread element being a sidewall secondary extension, said primary extension being longer than said secondary extension in a direction radially of said rotational axis and wider than said secondary extension in a direction circumferentially of said rotational axis, said tread elements having tread outer surfaces that intersect said primary extensions at primary intersections spaced a first distance from said tread centerline and that intersect said secondary extensions at secondary intersections spaced a second distance from said tread centerline that is greater than said first distance, alternate ones of said tread elements having said primary extensions on one of said sidewalls and said secondary extensions on the other of said sidewalls, and the remainder of said tread elements having said secondary extensions on said one of said sidewalls and said primary extensions on said other of said sidewalls.

12. The tire of claim 11 wherein said sidewall primary extensions have at least two steps therein to provide at least two primary extension support surfaces that face away from said rotational axis and are spaced different distances from said rotational axis and from said tread centerline.

13. The tire of claim 12 wherein said sidewall secondary extensions have a secondary extension support surface that faces away from said rotational axis and is located on a common circumferential path with one of said primary extension support surfaces.

14. A tire having a rotational axis, a circumferential tread and opposite sidewalls, said tread having a circumferential tread centerline and a plurality of circumferentially spaced tread elements that continuously extend from one sidewall to the other and are separated from one another by transverse slots, each of said tread elements having sidewall extensions at opposite ends thereof that extend along said sidewalls toward said rotational axis and that project outwardly from said sidewalls away from said tread centerline, alternate ones of said tread elements having alternate tread element outer edges spaced a first distance outwardly from said tread centerline, the remainder of said tread elements having remainder tread element outer edges spaced a second distance outwardly from said tread centerline that is greater than said first distance, said remainder of said tread elements being smaller than said alternate tread elements and having at least one step therein that faces away from said rotational axis, said sidewall extensions that extend along said sidewalls from said alternate ones of said tread elements having a pair of first and second steps therein with first and second step outer edges, said first step outer edge being spaced a third distance outwardly from said tread centerline that is greater than said second distance, and said second step outer edge being spaced a fourth distance outwardly from said tread centerline that is greater than said third distance.

15. The tire of claim 14 wherein said first and second step edges and said alternate outer edges of said tread elements are spaced different distances from said rotational axis.

16. A tire having a rotational axis, a circumferential tread and opposite sidewalls, said tread having a circumferential tread centerline and a plurality of circumferentially-spaced tread elements separated from one another by transverse slots, each of said tread elements having sidewall extensions at opposite ends thereof that extend along said sidewalls toward said rotational axis and that project outwardly from said sidewalls away from said tread centerline, said sidewall extension at one end of each said tread element being a sidewall primary extension and said sidewall extension at the opposite end of each said tread element being a sidewall secondary extension, said tread elements having tread outer surfaces that intersect said primary extensions at primary intersections spaced a first distance from said tread centerline and that intersect said secondary extensions at secondary intersections spaced a second distance from said tread centerline that is greater than said first distance, alternate ones of said tread elements having said primary extensions on one of said sidewalls and said secondary extensions on the other of said sidewalls, and the remainder of said tread elements having said secondary extensions on said one of said sidewalls and said primary extensions on said other of said sidewalls, said sidewall primary extensions each having at least one step therein to provide at least one primary extension support surface that faces away from said rotational axis, said tread elements having outer tread support surfaces spaced farther from said rotational axis than said primary extension support surfaces.

17. The tire of claim 16 wherein said sidewall extensions have outer surfaces with depressions therein that open outwardly in a direction away from said tread centerline.

18. The tire of claim 16 wherein each of said tread elements has an inner circumferential groove therein spaced a first distance from said tread centerline on one side thereof and an outer circumferential groove therein spaced a second distance that is greater than said first distance from said tread centerline on the other side thereof, and alternate ones of said tread elements having said inner circumferential grooves therein located on one side.

19. The tire of claim 16 wherein said sidewall primary extensions have at least two steps therein to provide at least two primary extension support surfaces that face away from said rotational axis and are spaced different distances from said rotational axis and from said tread centerline.

20. A tire having a rotational axis, a circumferential tread and opposite sidewalls, said tread having a circumferential tread centerline and a plurality of circumferentially-spaced tread elements separated from one another by transverse slots, each of said tread elements having sidewall extensions at opposite ends thereof that extend along said sidewalls toward said rotational axis and that project outwardly from said sidewalls away from said tread centerline, said sidewall extension at one end of each said tread element being a sidewall primary extension and said sidewall extension at the opposite end of each said tread element being a sidewall secondary extension, said tread elements having tread outer surfaces that intersect said primary extensions at primary intersections spaced a first distance from said tread centerline and that intersect said secondary extensions at secondary intersections spaced a second distance from said tread centerline that is greater than said first distance, alternate ones of said tread elements having said primary extensions on one of said sidewalls and said secondary extensions on the other of said sidewalls, and the remainder of said tread elements having said secondary extensions on said one of said sidewalls and said primary extensions on said other of said sidewalls, said sidewall primary extensions each having at least one step therein to provide at least one primary extension support surface that faces away from said rotational axis, said sidewall secondary extensions being smaller than said sidewall primary extensions.

21. The tire of claim 20 in which said primary extensions are longer than said secondary extensions in a direction radially of said rotational axis.

22. The tire of claim 20 in which said sidewall extensions have outer surfaces with depressions therein that open outwardly in a direction away from said tread centerline.

23. The tire of claim 20 in which said tread elements have circumferential central grooves therein, alternate ones of said tread elements having said central grooves therein located on one side of said tread centerline and the remainder of said tread elements having said central grooves therein located on the opposite side of said tread centerline.

24. The tire of claim 20 in which said sidewall primary extensions are wider than said sidewall secondary extensions, and in which the width of each sidewall primary extension is greatest at the end thereof closest to said rotational axis.

\* \* \* \* \*